United States Patent
Karp et al.

(10) Patent No.: US 10,025,874 B2
(45) Date of Patent: Jul. 17, 2018

(54) USER SPECIFIC VISUAL IDENTITY CONTROL ACROSS MULTIPLE PLATFORMS

(71) Applicant: TUMBLR, INC., New York, NY (US)

(72) Inventors: David Karp, Brooklyn, NY (US); Derek A. Gottfrid, New York, NY (US); Peter James Vidani, Brooklyn, NY (US); Zachary Coffman Sultan, Brooklyn, NY (US); Pau Santesmasses, South Orange, NJ (US)

(73) Assignee: TUMBLR, INC., New York, NY (US)

( * ) Notice: Subject to any disclaimer, the term of this patent is extended or adjusted under 35 U.S.C. 154(b) by 87 days.

(21) Appl. No.: 14/257,469

(22) Filed: Apr. 21, 2014

(65) Prior Publication Data
US 2015/0304447 A1    Oct. 22, 2015

(51) Int. Cl.
G06F 17/30 (2006.01)
G06F 17/24 (2006.01)
H04L 29/08 (2006.01)
H04L 29/06 (2006.01)
G06F 17/22 (2006.01)

(52) U.S. Cl.
CPC ...... G06F 17/30905 (2013.01); G06F 17/227 (2013.01); G06F 17/248 (2013.01); G06F 17/3089 (2013.01); H04L 67/2823 (2013.01); H04L 67/303 (2013.01);
(Continued)

(58) Field of Classification Search
CPC ............ G06F 17/2247; G06F 17/248; G06F 17/30905; G06F 17/2258; G06F 17/2264; G06F 17/227; G06F 17/30867; G06F 17/3089; G06F 17/30893; G06F 17/30896; G06F 17/30899; H04L 67/303; H04L 67/2823; H04L 67/02; H04L 67/04;
(Continued)

(56) References Cited

U.S. PATENT DOCUMENTS 6,560,604 B1 *  5/2003  Fascenda ............ G06F 9/44505
                                                        707/999.01
7,689,575 B2 *  3/2010  Ramachandran ... G06F 17/3089
                                                        707/999.101
(Continued)

OTHER PUBLICATIONS

Sabin-Wilson, Lisa. WordPress for Dummies. 3rd ed. Hoboken: Wiley, 2010, pp. 46-48 and 287-292.*
(Continued)

Primary Examiner — Vivek Srivastava
Assistant Examiner — William C McBeth
(74) Attorney, Agent, or Firm — James J. DeCarlo; Greenberg Traurig, LLP

(57) ABSTRACT

A content-generating user is enabled to set visible attributes for a content item from any device so that the content item maintains a uniform look and feel across the various platforms. The visible attributes set by the generating user are stored in the user's profile on a user profile database. When a request to display the content item is received from a client device, the platform associated with the request is determined. Display data comprising one or more of the visible attributes retrieved from the user profile database, the content item and a template based on the platform is transmitted to the client device. The client device configures a display of the content item to a viewer based on the received display data.

20 Claims, 14 Drawing Sheets

(52) U.S. Cl.
CPC ............ *H04L 67/306* (2013.01); *H04L 67/42* (2013.01); *G06F 17/2247* (2013.01)

(58) Field of Classification Search
CPC ....... H04L 67/30; H04L 67/306; H04L 67/42; H04N 21/25825; H04N 21/25833; H04N 21/8543
USPC ........ 709/203, 217, 219; 715/234, 235, 243, 715/248
See application file for complete search history.

(56) References Cited

U.S. PATENT DOCUMENTS

| | | | | |
|---|---|---|---|---|
| 8,230,354 | B2* | 7/2012 | Karul | G06Q 30/02 358/1.15 |
| 8,423,889 | B1* | 4/2013 | Zagorie | G06F 17/30905 715/255 |
| 8,949,370 | B1* | 2/2015 | Wu | H04W 4/003 709/203 |
| 2002/0191018 | A1* | 12/2002 | Broussard | H04L 67/04 715/740 |
| 2002/0194379 | A1* | 12/2002 | Bennett | H04L 29/06 709/246 |
| 2002/0198931 | A1* | 12/2002 | Murren | H04L 29/06 709/203 |
| 2003/0163517 | A1* | 8/2003 | Assaf | H04W 28/06 709/203 |
| 2006/0041685 | A1* | 2/2006 | Bracewell | G06F 17/30893 709/246 |
| 2007/0038931 | A1* | 2/2007 | Allaire | G06Q 30/0239 715/206 |
| 2007/0061428 | A1* | 3/2007 | Haley | G06F 17/30893 709/220 |
| 2007/0100959 | A1* | 5/2007 | Eichstaedt | H04L 67/306 709/217 |
| 2008/0235601 | A1* | 9/2008 | Fried | G06F 17/30873 715/760 |
| 2009/0024930 | A1* | 1/2009 | Kim | G06F 17/30905 715/744 |
| 2009/0037454 | A1* | 2/2009 | Sampson | G06F 17/3089 |
| 2009/0063659 | A1* | 3/2009 | Kazerouni | G06F 9/4443 709/219 |
| 2009/0106663 | A1* | 4/2009 | Pirie | G06Q 30/02 715/744 |
| 2009/0112824 | A1* | 4/2009 | Fu | G06F 17/30905 |
| 2010/0077350 | A1* | 3/2010 | Lim | G06Q 10/107 715/810 |
| 2010/0138753 | A1* | 6/2010 | Riggs | G06F 17/3089 715/745 |
| 2010/0185664 | A1* | 7/2010 | Baggott | G06F 17/3089 707/769 |
| 2010/0250647 | A1* | 9/2010 | Rajan | G06F 17/30905 709/203 |
| 2011/0107225 | A1* | 5/2011 | Sukanen | H04L 67/02 715/736 |
| 2011/0185040 | A1* | 7/2011 | Schmidt | G06F 17/30905 709/217 |
| 2011/0238688 | A1* | 9/2011 | Mercuri | G06Q 30/02 707/769 |
| 2012/0030596 | A1* | 2/2012 | Hanes | G06F 3/0481 715/765 |
| 2012/0047425 | A1* | 2/2012 | Ahmed | G06F 17/30905 715/234 |
| 2012/0150993 | A1* | 6/2012 | Flack | H04L 67/2819 709/217 |
| 2012/0226970 | A1* | 9/2012 | Porter | G06F 9/45529 715/234 |
| 2013/0024757 | A1* | 1/2013 | Doll | G06F 17/248 715/204 |
| 2013/0036196 | A1* | 2/2013 | Chan | H04N 21/42202 709/217 |
| 2013/0066947 | A1* | 3/2013 | Ahmad | G06F 9/44526 709/203 |
| 2013/0117351 | A1* | 5/2013 | Zoheir | G06F 17/30905 709/203 |
| 2013/0132422 | A1* | 5/2013 | Rogish | G06F 17/3089 707/769 |
| 2013/0144692 | A1* | 6/2013 | Shalabi | G06F 17/248 705/14.4 |
| 2013/0145251 | A1* | 6/2013 | Jureidini | G06F 17/30896 715/234 |
| 2014/0075289 | A1* | 3/2014 | Brant | G06F 17/248 715/234 |
| 2014/0129925 | A1* | 5/2014 | Faletski | G06F 17/2247 715/234 |
| 2014/0201258 | A1* | 7/2014 | Jowett | H04L 67/02 709/203 |
| 2014/0245196 | A1* | 8/2014 | Zheng | G06F 8/38 715/762 |
| 2014/0325374 | A1* | 10/2014 | Dabrowski | G06F 9/4443 715/744 |
| 2014/0331124 | A1* | 11/2014 | Downs | G06F 17/212 715/243 |
| 2015/0040098 | A1* | 2/2015 | Akins | G06F 8/36 717/106 |
| 2015/0248423 | A1* | 9/2015 | Christolini | G06F 17/3089 715/202 |

OTHER PUBLICATIONS

Gebistorf, "Enhancement of website usability for mobile phones", Swiss Federal Institute of Technology, 2011.*

* cited by examiner

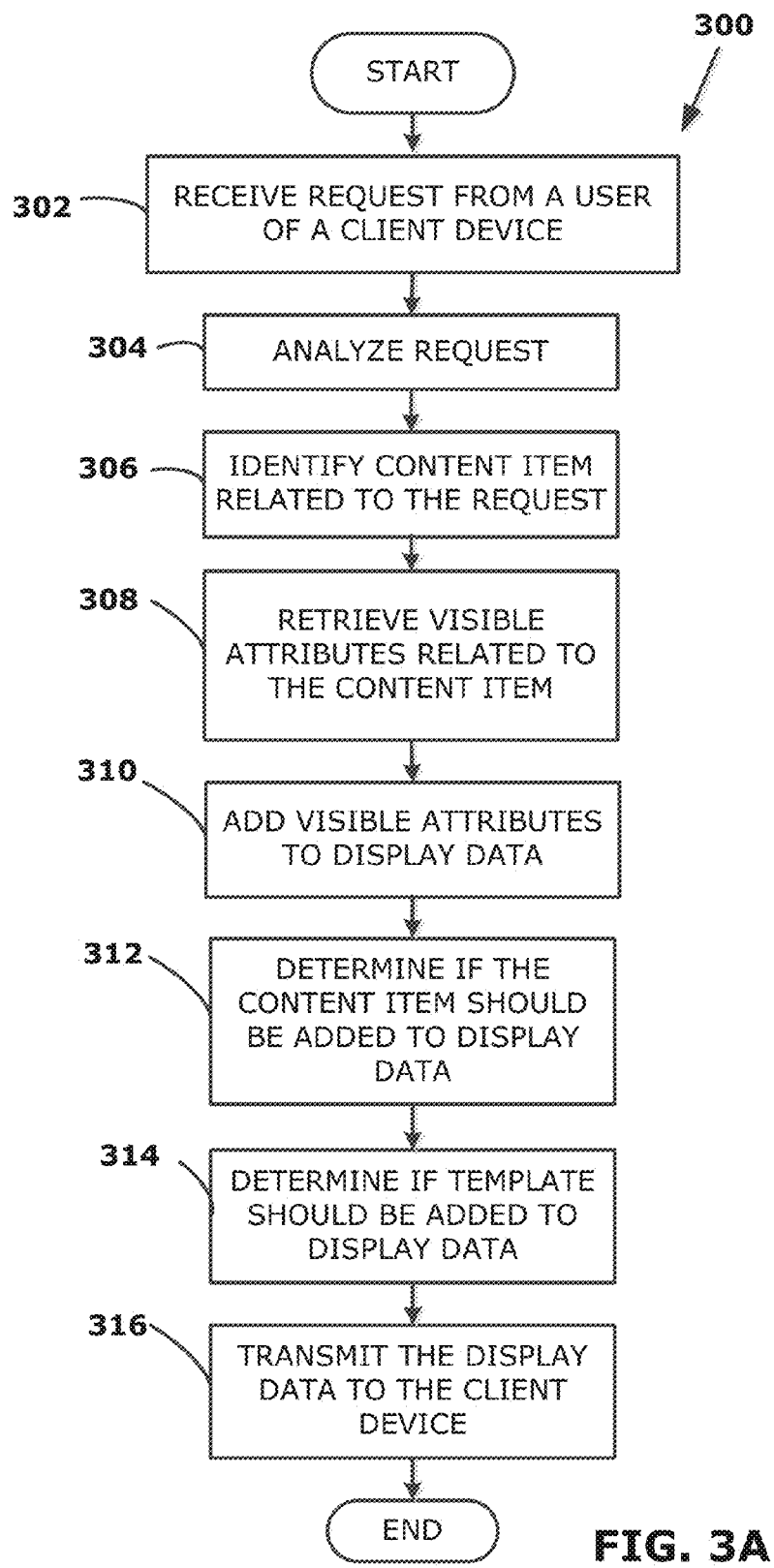

USER SPECIFIC VISUAL IDENTITY CONTROL ACROSS MULTIPLE PLATFORMS

BACKGROUND

Rapid advancements in electronics and data networks lead to the development of communication devices such as computers which are also configured to provide content. Further advances lead to mobile communication and content-providing devices such as tablet devices and smartphones. Different types of content such as text, audio, video or combinations thereof are provided to the users via such devices. As a result of these advancements, various platforms comprising different combinations of applications, operating systems and the hardware for their execution have evolved. This in turn has resulted in the development of various proprietary and platform-agnostic content formats.

SUMMARY

Different embodiments disclosed herein relate to systems and methods for maintaining a uniform look and feel for content across the various platforms. A method for maintaining a uniform quality for content across different platforms is disclosed in one embodiment. The method comprises, receiving, by a processor, a request from a client device for at least visible attributes of a content item, wherein the content item is customized in accordance with the visible attributes set by a user generating the content item. The visible attributes of the content item are retrieved from the generating user's profile, by the processor and selected as display data to be transmitted to the client device. Based on the request, it is further determined by the processor if the display data to be transmitted to the client device additionally comprises a template. If it is determined by the processor that no template should be included in the display data, one or more of the visible attributes and the content item are transmitted as display data to the client device.

If it is determined by the processor that the display data additionally includes a template, then the template is selected by the processor from a plurality of templates based on the platform of the client device. Each of the plurality of templates is configured for a respective platform and each template is further configured to maintain the visible attributes of the content item on a respective platform in accordance with the generating user's preferences. The selected template is included by the processor in the display data to be transmitted to the client device.

In one embodiment, the method further comprises determining by the processor based on the request, if the content item also should be included in the display data to be transmitted to the client device. If it is determined by the processor that the content item should be included in the display data, the display data that includes at least the visible attributes and the content item is transmitted to the client device.

In one embodiment, the visible attributes are stored as an ordered set of name value pairs in the generating user's profile. A user interface can be provided by the processor to the generating user for providing the visible attributes. The user interface enables the processor to receive input from the generating user for changing at least one of the visible attributes and to change the value of the at least one visible attribute based on the input.

In an embodiment, the content is a blog and the values associated with the visible attributes can determine a header image, an avatar and a background of the blog. In a further embodiment, the blog can comprise content from a first blog and a second blog not owned by the user generating the blog. In this case, the display data further comprises the visible attributes provided by a first user generating the first blog and a second user generating the second blog.

An apparatus comprising at least one processor and a storage medium for tangibly storing thereon program logic for execution by the processor is disclosed in one embodiment. The programming logic comprises receiving logic is executed by the processor, for receiving a request from a client device. In one embodiment, the request is for obtaining at least visible attributes of a content item, wherein the content item is customized in accordance with visible attributes set by a user generating the content item. Retrieving logic is executed by the processor, for retrieving from the generating user's profile, the visible attributes of the content item. The processor executes attributes selecting logic, for selecting at least the visible attributes as display data to be transmitted to the client device. Template determining logic, is executed by the processor, for determining based on the request, if the display data to be transmitted to the client device additionally comprises a template. If it is determined by the processor via the template determining logic, that no template is required to be included in the display data, one or more of the visible attributes and the content item are transmitted as display data to the client device via the transmitting logic executed by the processor.

If it is determined by the processor that the display data additionally comprises a template, then, template selecting logic is executed by the processor, for selecting the template from a plurality of templates based on a platform of the client device. Each of the plurality of templates is further based on a respective application programming interface (API) associated with the respective platform wherein the platform comprises a combination of hardware and software operable to render the content on the client device. Template including logic, is also executed by the processor, for including the selected template in the display data to be transmitted to the client device. One or more of the visible attributes and the selected template are transmitted as display data to the client device via the transmitting logic executed by the processor.

A computer readable storage medium comprising processor-executable instructions is disclosed in an embodiment. The instructions enable the processor to receive a request from a client device wherein the request is associated with at least visible attributes of a content item, wherein the content item is customized in accordance with the visible attributes set by a user generating the content item. The instructions further cause the processor to retrieve the visible attributes of the content item and select at least the visible attributes as display data to be transmitted to the client device. The instructions also cause the processor to determine based on the request if the display data to be transmitted to the client device additionally comprises a template. If it is determined that the display data to be transmitted to the client device does not include a template, then display data comprising at least the visible attributes are transmitted to the client device by the processor in accordance with the instructions. If it is determined by the processor that the display data additionally comprises a template, then the instructions cause the processor to select the template from a plurality of templates based on a platform of the client device. The selected template is included in the display data and transmitted to the client device in addition to at least the visible attributes. In one embodiment the computer readable medium further comprises instructions that cause the processor to receive an input from the generating user for changing at least one of the visible attributes and to change a value of the at least one visible attribute based on the input.

In one embodiment, the visible attributes are stored as an ordered set of name value pairs in the generating user's profile. The instructions cause the processor to receive an input from the generating user for changing at least one of the visible attributes. The value of the at least one visible attribute is changed based on the input.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views:

FIG. 3A is a flowchart that details a methodology of providing content to users in accordance with one embodiment.

DESCRIPTION OF EMBODIMENTS

Figure 1:
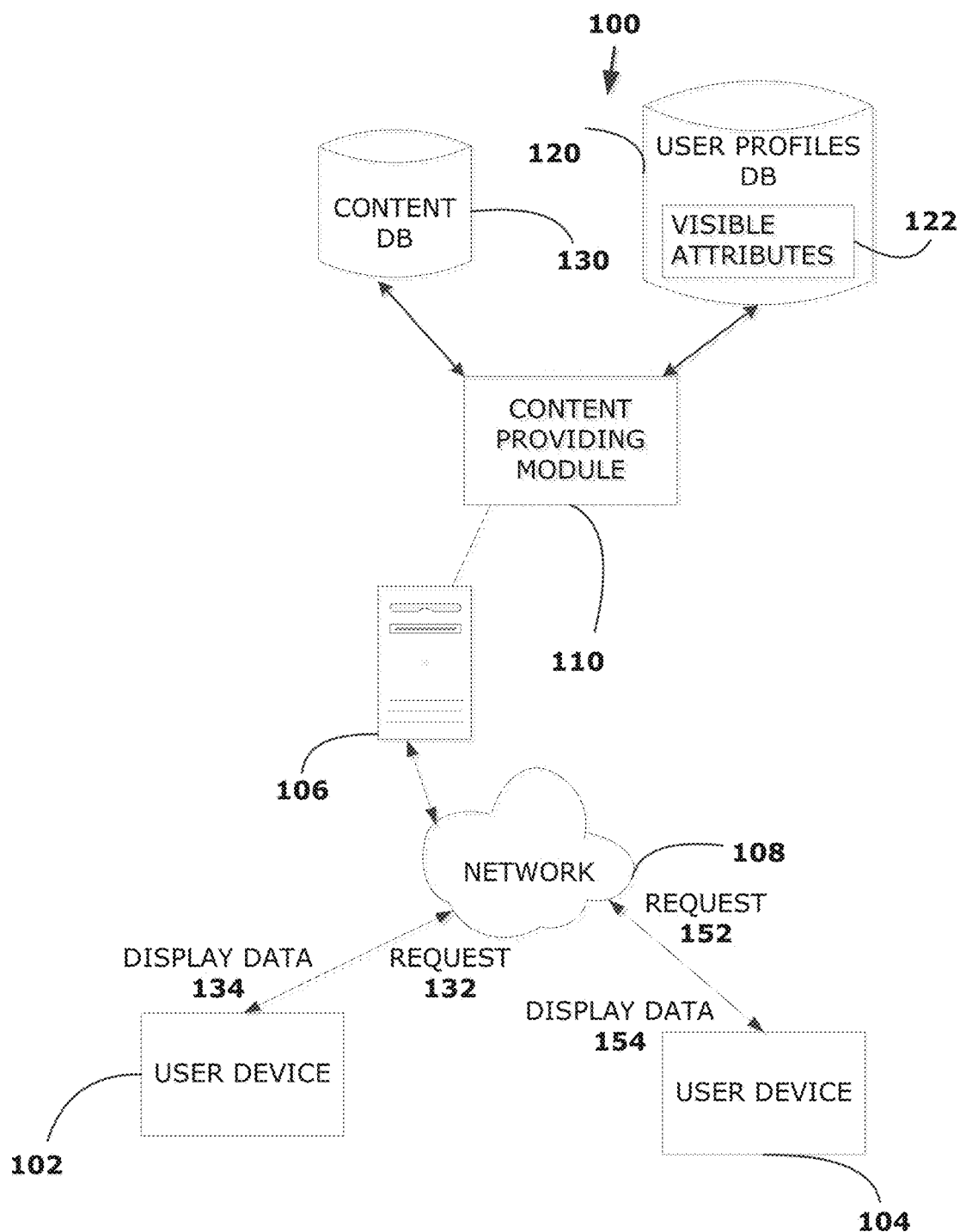
FIG. 1 shows a content provider's network in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments of the disclosed subject matter are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The development of various formats for content and different platforms for providing content has led to difficulties in the display of the content. Content that is developed on one platform may not appear on another platform as intended by the content developer. For example, a webpage designed for a laptop appears differently when accessed by a smart phone. As a result, the content developer may need to configure different various versions of a content item so that it maintains a uniform look and feel on different platforms. This problem can be exacerbated for amateur content providers, such as bloggers, who may not be professional programmers. For example, when bloggers post their content to the hosting website, they may use different formats for their text, voice or video data. Moreover, they may not always provide content consistently from a particular device. They may use different devices and operating systems when providing content. Systems and methods are disclosed herein that enable a content provider to provide tools for users generating content to configure the content to appear uniformly across different platforms. The disclosed embodiments facilitate the generating user to set visible attributes at the time of content generation, which visible attributes are then provided to the various platforms at the time of providing the content so that the content can be displayed on these platforms as intended by the generating user.

Turning now to FIG. 1, a content provider's network 100 is illustrated in accordance with one embodiment. A plurality of client devices 102 and 104 access the server 106 of the content provider via a network 108. In one embodiment, the client devices 102 and 104 can comprise devices such as, desktops, laptops, tablet devices, and smartphones. The server 106 comprises content providing module 110 which, upon receiving a request 132 from the client device 102, analyzes the request 132 in order to identify the various components of the display data 134 that should be transmitted to the client device 102 in response to its request 132.

Based on the analysis, the content providing module 110 can determine that one or more of the requested content item, the visible attributes 122 of the requested content item and a template for the requested content item are to be included in the display data 134. The requested content item is obtained by the content providing module 110 from the content database 130. In an embodiment the content database 130 can store content generated by users. For example, the content generated by the users can include blogs wherein users post their messages, audio and video data. A user may have his or her own blogs for which he or she is designated as the 'owner' or the generating user. In an embodiment, a user may also post content to other users' blogs for which he or she is not the generating user. Such content can be submitted (contingent on approval) to blogs that explicitly accept such submissions.

In one embodiment, the content providing module 110 identifies not only the specific content item requested by the client device 102, but also retrieves the visible attributes 122 of the content item that determine the appearance of the content item to a viewer employing the client device 102. In an embodiment wherein the content item is generated by a user, the visible attributes 122 are set by the generating user. Therefore, the visible attributes 122 are retrieved from the generating user's profile on the user profile database 120. Display data 134 comprising at least the requested content item and the visible attributes 122 are transmitted to the client device 102 in response to the request.

In one embodiment, based on the analysis of the request 132, the content providing module 110 determines that only the visible attributes 122 are to be transmitted to the client device 102. Accordingly the display data 134 transmitted to the client device 102 will include only the visible attributes 122. For example, embodiments are detailed infra wherein when a viewer hovers over a content item displayed on the client device 102, special user interface elements are displayed to the viewer. In this case, the request 132 can be directed only towards the visible attributes 122 of the content item over which the viewer hovers in order to generate a pop over (not shown) as will be detailed further infra.

In one embodiment, based on the analysis of the request 132 the content providing module determines that a template should be included the display data 134 to be transmitted to the user device 102. This determination can be made by the content providing module 110 from the information associated the platform of the client device 102 which is included in the request 132. For example, the information associated with the platform can comprise identifying indicia of the components such as the hardware and the software of the client device 102 that are operable to display the content. The template enables the client device 102 to render the requested content item in accordance with the visible attributes 122 as retrieved from the generating user's profile on the user profile database 120. Therefore, in accordance with this embodiment the display data 134 comprises at least the visible attributes 122 and the template. The display data 134 may also comprise the requested content item in addition to the visible attributes 122 and the template in accordance with further embodiments.

As described herein the content providing module 110 further enables users generating the content to set attributes for their content. For example, user generated content such as a blog can have its content attributes set by the owner of the blog. In an embodiment, the generating user can set the visible attributes 122 that determine how the content appears to other viewers. The visible attributes 122 set by the generating user are stored in a respective user's profile in the user profile database 120 and are configured to be used by different platforms. In an embodiment the visible attributes 122 can be encoded in a lightweight data interchange format such as JSON (JavaScript Object Notation). The visible attributes 122 can be stored as an ordered set of name-value pairs in a user profile. It may be appreciated the user profile database 120 may store for a single user profile, a plurality of attribute sets for different blogs of the user. Thus, a collection of the visible attributes 122 can be identified by a unique combination of the user and content identification indicia. It can be appreciated that when a user who is not the owner posts content to a blog then such content will be displayed across the platforms based on the visible attributes 122 as provided by the owner/the generating user. An owner of a blog can be an individual or an institution. In case of institutions, the visible attributes 122 for the blogs will be provided by their respective administrative users.

By the way of illustration and not limitation, the visible attributes 122 that can be set by the generating user can comprise an avatar, a background for the blog, a title of the blog, a header image for the blog and the various attributes associated with the font of the blog, such as, the color, the size, the type of font and the like. In addition, a template can be selected for the display of the requested content in accordance with the visible attributes 122 set by the generating user in the user profile database 120. Display data 134 comprising one or more of the requested content, the selected template and the visible attributes 122 are transmitted to the requesting client device 102. The requesting client device 102 receives the display data 134 and generates a display of the content item based on the received template and the visible attributes 122.

Thus, the content is displayed to the viewers in a manner as determined by the generating user. If a request 152 for the same content item is received from a disparate client device 104, the content providing module 110 executes a similar procedure as detailed supra to provide the display data 154. However, the display data 154 transmitted to the client device 104 will be based on an analysis of the request 152 received from the client device 104. Again, the display data 154 transmitted to the client device 104 can comprise one or more of the content item, the visual attributes 122 and a template. If a template is included in the display data 154 and, if the client devices 102 and 104 are associated with the different platforms, different templates are selected for inclusion into the display data 134 and 154. However, the content item display shown to the viewers on the client devices 102 and 104 can be uniform. Thus, when the generating user sets visible attributes 122 for the content, and tests the resulting display, He or she is assured that the content will be displayed to all the viewers in the same manner as displayed on his or her device regardless of the platforms the other viewers employ to access the content. It may be appreciated that this is because the content will be displayed to the generating user also by selecting an appropriate template.

Figure 2:
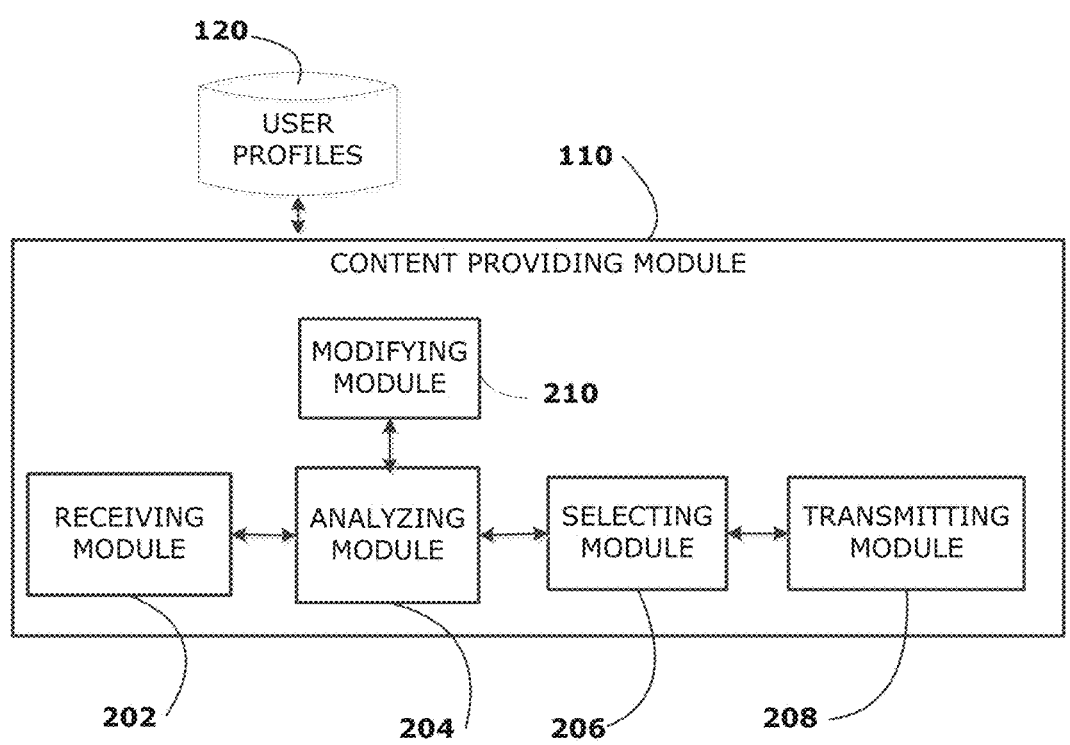
FIG. 2 shows a schematic diagram of the content providing module in accordance with one embodiment.

FIG. 2 shows a schematic diagram of the content providing module 110 in accordance with one embodiment. The content providing module 110 comprises a receiving module 202, an analyzing module, 204, a selecting module 206, a transmitting module 208 and a modifying module 210. When a request is received by the receiving module 202, it is communicated to the analyzing module 204 to determine a methodology for processing the request. In an embodiment, the request can be transmitted by a user generating content or setting visible attributes for a content item in the content database 130. In this case, the request is directed by the analyzing module 204 to the modifying module 210. The modifying module 210 is communicatively coupled to the user profile database 120 and sets or modifies visible attributes in a respective user profile associated with the request.

In an embodiment, a request 132 can be received from a viewer employing the client device 102. Accordingly the analyzing module 204 analyzes data included in the request 132 and determines the display data 134 to be transmitted to the client device 102 in response to the request 132. For example, if the request 132 is a HTTP (Hypertext Transfer Protocol) request, the header and body of the HTTP request includes information such as but not limited to the identity of the device making the request, an acceptable response and the content item that a viewer of the client device 102 desires access to. Based at least on the analysis, the display data 134 can include one or more of the content item, the visual attributes 122 provided by the generating user for the content item and/or a template. In an embodiment, the request 132 can be directed towards the content item, its visible attributes 122 and a template. In an embodiment wherein a content item was previously transmitted to the client device 102, the request 132 can be directed towards one or more of the visible attributes 122 of the previously transmitted content item and a template. In an embodiment, wherein the content item was previously transmitted to the client device 102 and the template already exists at the client device 102, the request 132 can be directed only towards the visible attributes 122.

Based on the analysis of the request 132, the analyzing module 204 can transmit to the selecting module 206 information regarding the various components to be included in the display data 134 that should be transmitted in response to the request 132. If the analyzing module 204 determines that one or more of the content item and its visible attributes 122 should be included in the display data 134, the identity of the content item can be transmitted to the selecting module 206. In an embodiment wherein only the visible attributes 122 are to be included in the display data 134, the analyzing module 204 may provide a further indication to the selecting module 206 to transmit only the visible attributes 122. In the embodiments wherein the analyzing module 204 determines that a template should be included in the display data 134, information regarding the platform associated with the client device 102 is further communicated by the analyzing module 204 to the selection module 206. In an embodiment, the request 132 itself can include information regarding the platform of the client device 102 which can be employed by the analyzing module 204 in determining whether or not to include the template in the display data 134. By way of illustration and not limitation, the header of the request may include information regarding the platform. In an embodiment, the server 106 may provide a response to the client device 102 requesting further information regarding its platform. Other protocols can also be implemented to determine the platform of the client device 102 in accordance with some embodiments.

Based on the information received from the analyzing module 204, the selecting module 206 selects one or more of the content item, its visible attributes 122 and a template for transmitting as the display data 134 to the client device 102. For example, if the information received by the selecting module 206 from the analyzing module 204 includes the identity of the content item, the visible attributes 122 of the identified content item are included in the display data 134. If a further indication to include the content item in the display data 134 is received, the selecting module 206 retrieves the appropriate content item from the content database 130 and includes it along with the visible attributes 122 as components to be transmitted as the display data 134 If the information received by the selecting module 206 also includes information regarding the platform of the client device 102, a template is further selected as part of the display data 134 to be transmitted to the client device 102.

In an embodiment, the templates are based the APIs (Application Programming Interfaces) which enable exposing functionality of an application programmatically to other applications. Different APIs can be selected based on the type of content and the software such as the operating system and/or software executed on the client device 102 that is operable to generate a display of the requested content. For example, different content such as a blog, or the user's dashboard including a collection of blogs followed by the user can use different APIs to access information in the databases 120 and 130. In an embodiment, the content providing module 110 can store a plurality of templates associated with different APIs. For example, the templates can be associated with APIs of the various operating systems. The APIs facilitate transfer of data from the content database 130 or the user profile database 120 to platform specific needs. The selecting module 206 further accesses the user profile database 120 to retrieve the visible attributes 122 provided by the generating user and stored in the respective user profile. The information that is collected by the selecting module 204 is transmitted to the transmitting module 208.

The transmitting module 208 transmits the display data 134 comprising one or more of the content item, the selected template and the visible attributes 122 to the client device 102. The client device 102 receives the display data 134 from the assembling module 206 and generates a display to a viewer. The display can be generated by the browser or other programs such as apps executing on the client device 102. The display generated by the client device 102 can comprise the content item customized per the visible attributes 122 or it may show just the visible attributes 122 as a pop-over on a previously received and rendered content item. In addition, if the client device 102 does not have a template, the template transmitted in the display data 134 can be employed for generating a display of one or more of the content item and the visible attributes 122.

Figure 3B:
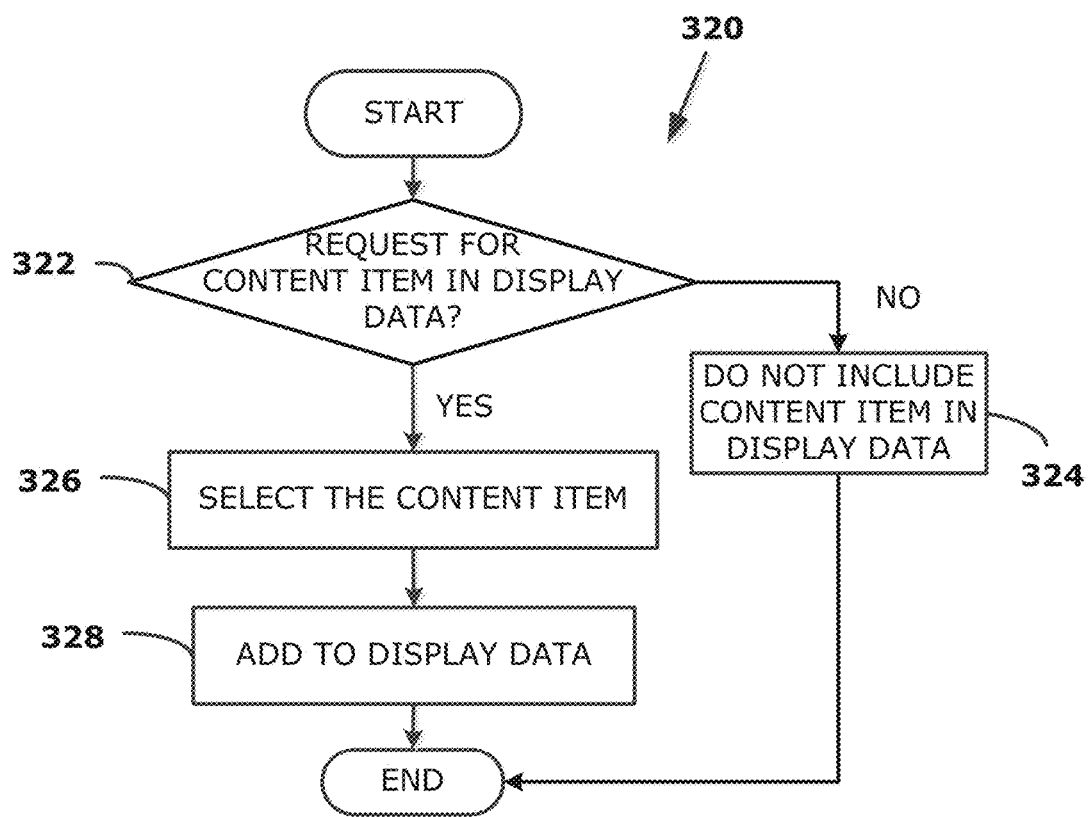
FIG. 3B is a flowchart that details a methodology of determining components of the display data in accordance with one embodiment.

FIG. 3A is a flowchart 300 that details a methodology of providing content to users in accordance with one embodiment. The method begins at step 302 wherein a request is received of from the client device 102. At 304, the received request is analyzed in order to determine the content item associated with the request and the various components that are to be included in the display data. In one embodiment, a request may be received from the client device 102 exclusively for the visible attributes 122 of the content item. In one embodiment the request may be received for one or more of the content item, its visible attributes 122 and a template to display the content item in accordance with the visible attributes 122 set by the generating user. At 306, the content item associated with the request is identified. At 308 the visible attributes 122 for the identified content item are retrieved from the generating user's profile in accordance with embodiments described herein. The visible attributes 122 are stored in a format that can be accessed and read by different platforms. For example, the visible attributes 122 can be stored in JSON format as an ordered list of name value pairs. The visible attributes 122 thus retrieved are added at 310 to the display data to be transmitted to the client device 102. At 312 it is further determined if the content item identified at step 306 should be added to the display data. The determination of whether the content item should be added to the display data is made based on the analysis of the received request at 304. Further details of this determination are shown in the flowchart 320 of FIG. 3B which will be detailed further infra. At 314, it is further determined if a template should be added to the display data. Further details regarding this determination are shown in the flowchart 330 of FIG. 3C which will be described infra. At 316, the display data thus obtained comprising at least the visual attributes 122 and other components based on the determinations at steps 312 and 314 is transmitted to the client device 102. When the transmitted display data is received by the client device 102, it is processed by a client-side application such as a browser or an 'app' in order to render the requested content to a viewer as determined by the generating user.

FIG. 3B is a flowchart 320 that details a methodology of determining components of the display data in accordance with one embodiment. The method begins at 322 wherein the request is analyzed to identify if the content item identified at 306 is requested or if only the visible attributes 122 of the identified content item are requested by the client device 102. If it is determined at 322 that only the visible attributes 122 are requested by the client device 102, then the method branches to 324 where the content item is not added to the display data and the method terminates on the end block. If it is determined at 322 that the content item identified at 306 was also requested by the client device 102, then the content item is selected at 326 for addition to the display data. The selected item is added to the display data as shown at 328. In this embodiment the display data therefore comprises at least two components, the visible attributes 122 and the identified content item.

Figure 3C:
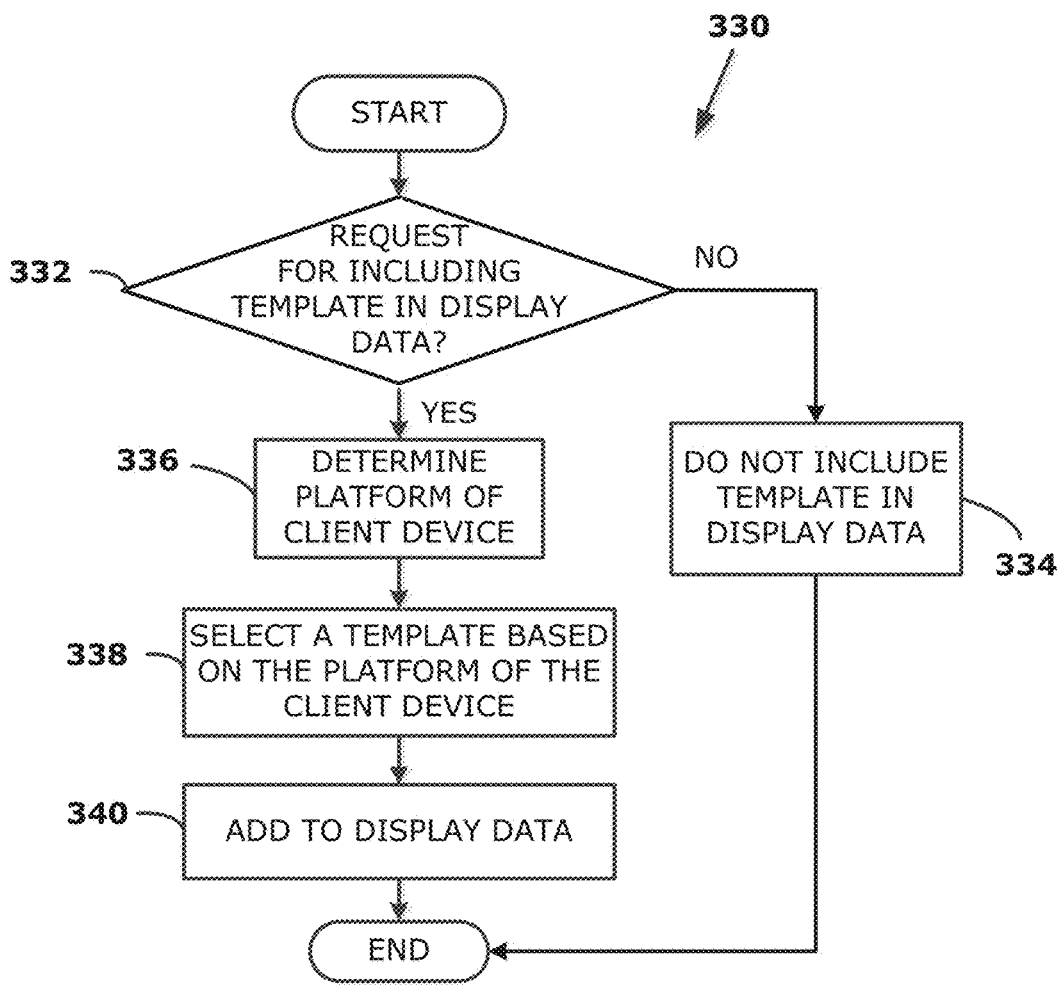
FIG. 3C is a flowchart that details a methodology of determining components of the display data in accordance with one embodiment.

FIG. 3C is a flowchart 330 that details a methodology of determining components of the display data in accordance with one embodiment. The method begins at 332 wherein the request is analyzed to identify if a template for displaying the visible attributes 122 should be included in the display data. As described herein because of the various platforms that are used by different viewers to access the content item and because of the differences between the platforms it may not be displayed as intended by the generating user on the different platforms. Hence, the content providing module 110 enables the generating user to set cross-platform visible attributes 122 for the content item so that it is enabled to have a uniform look and feel across the different platforms. In one embodiment, a platform can comprise a combination of one or more of the client device 102, its operating system and application(s) that display the content item. In one embodiment, if it is determined from the analysis of the request at 304 that the client device 102 is for example, a laptop, and employs the HTTP request/response protocol to communicate with the content providing module 110, then the received request can be identified as a request to transmit a template along with the visible attributes 122 and/or the content item. In one embodiment, if it is determined from the analysis of the request at 304 that the client device 102 is associated with the platform that has a template incorporated therein, then it can be determined that no template needs to be included in the display data. By the way of illustration and not limitation devices enabled with their own operating systems and API and which do not require a template for maintaining the visual attributes 122 can be those devices with mobile operating systems, for example, iPhone. Therefore, based on the analysis at 304, it is determined at 332 whether the request is for including the template with the display data. It is determined at 332 that the request was received from the client device 102 which includes a mobile operating system and related API and hence requires no template, then no template is included in the display data as shown at 334 and the method terminates on the end block.

If it is determined at 332 that the request was received from a client device 102 that requires a template for displaying the content item in accordance with the visible attributes 122, the platform of the client device 102 is determined as shown at 336. At 338, the template for including in the display data 134 is selected based on the platform of the client device 102. More particularly, a template configured from the API of the detected platform is selected at 338. The selected template is added to the display data at 340.

Figure 4:
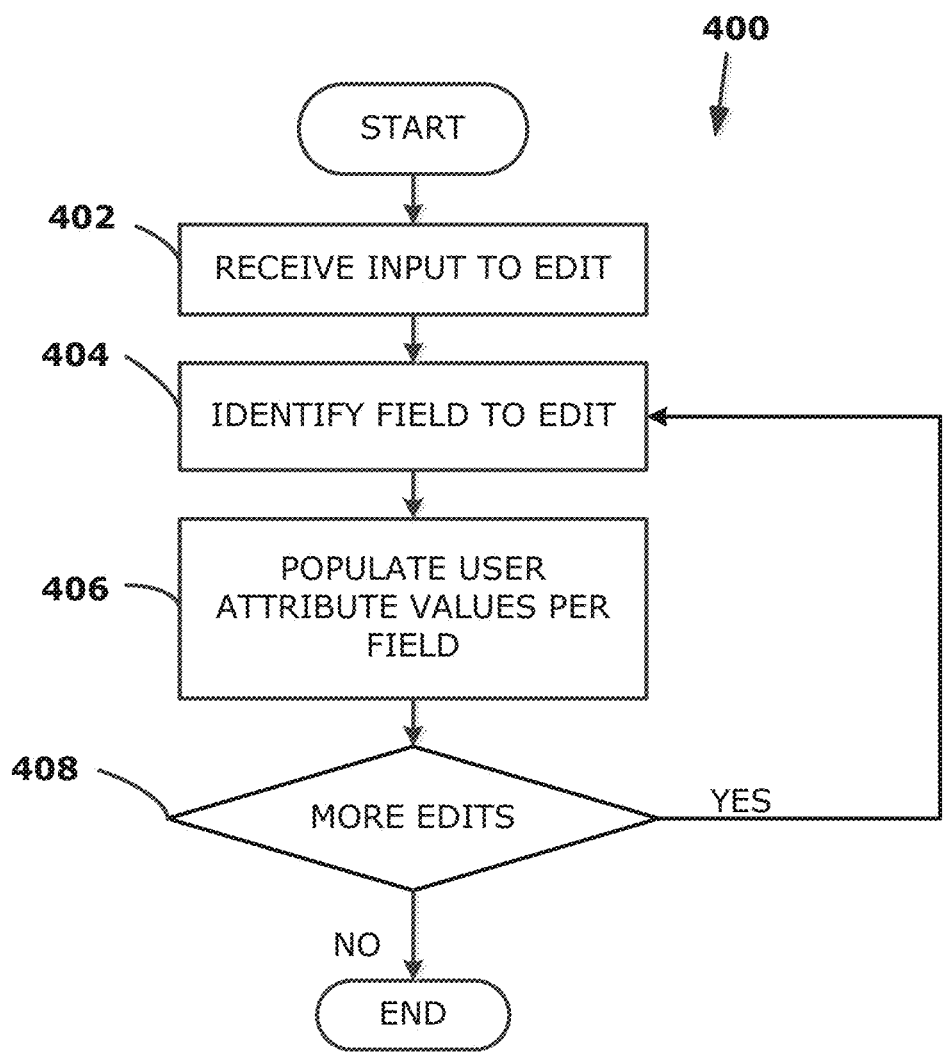
FIG. 4 is a flowchart that illustrates a method of editing the visible attributes of content by a user generating the content in accordance with one embodiment.

FIG. 4 is a flowchart 400 that illustrates a method of editing the visible attributes 122 of content by a user generating the content in accordance with one embodiment. The method starts at 402 wherein input is received from the generating user which indicates the user's intent to edit attributes of the content item. The user can edit one or more attributes associated with the appearance of the content item. In one embodiment, each field can be associated with a plurality of visible attributes 122. The generating user may edit attributes like images, text, format for the text and the like. For example, an image field may be associated with attributes such as size, location in the content item whereas a text field such as a heading can have attributes like font type, font size and color. At 404 a field the user intends to edit is identified. In one embodiment, the field the user intends to edit can be identified from user input on the field such as a click, a tap, or other user gesture selecting the field. At 406, the visible attribute values provided by the user for the selected field are received and populated within the user profile on the user profile database 120. At 408 it is determined if the user wants to edit more attributes. If yes, the method returns to 404 wherein the next field to edit is identified else the method terminates on the end block.

Figure 5:
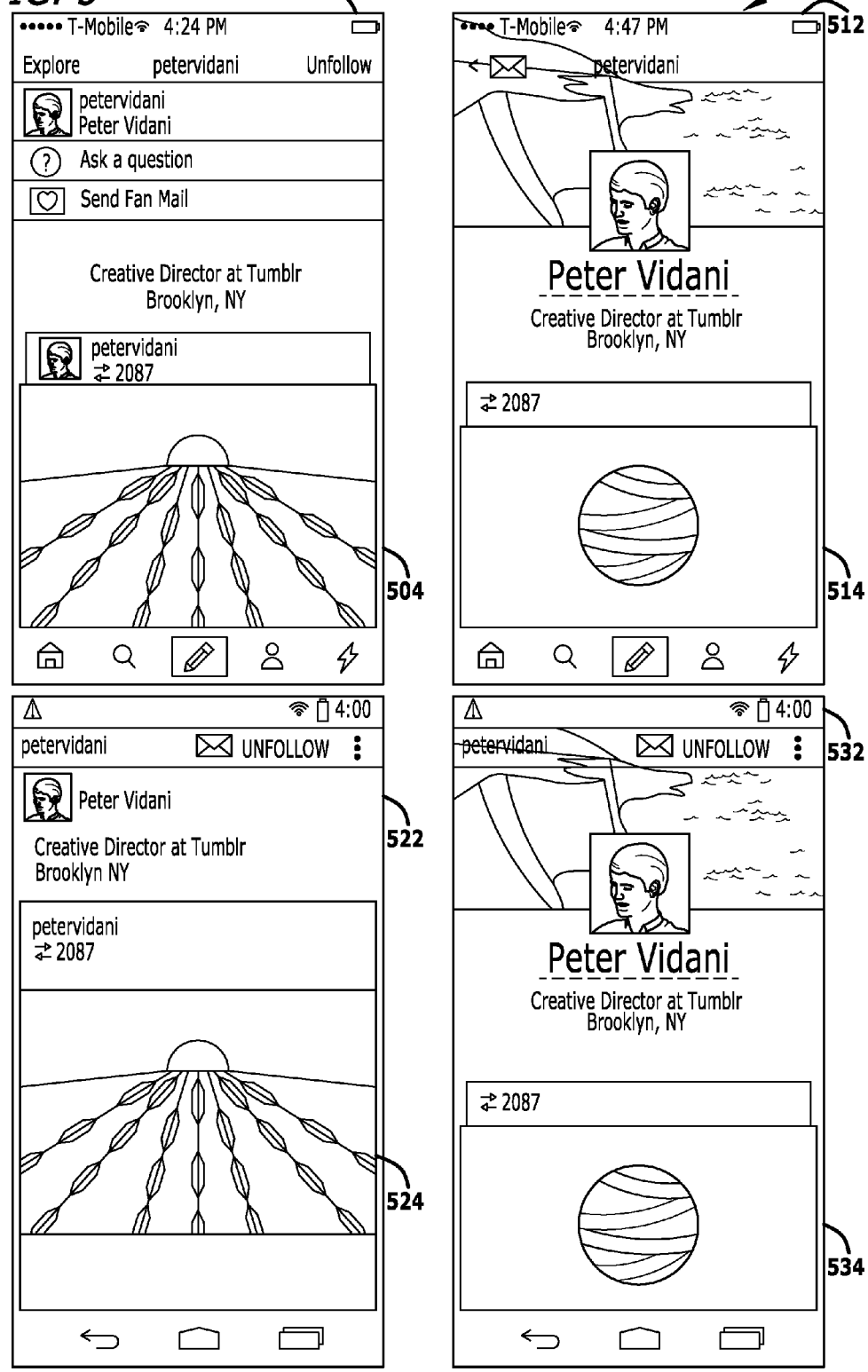
FIG. 5 shows a comparison of the provided content in accordance with embodiments described herein.

FIG. 5 shows a comparison 500 between embodiments implementing cross-platform visible attributes 122 in accordance with embodiments described herein versus embodiments that do not implement the cross-platform visible attributes 122. A schematic diagram of a display 502 comprising user provided content generated by a first smart phone executing the iOS operating system is shown. More particularly, the screen 502 is generated based on the display data received by the first smart phone from a content providing system (not shown) that does not include the cross-platform visible attributes 122 as outlined herein. Similarly the display 522 is generated by a second smart phone executing Android operating system. The display 522 is generated based on the display data received from a content providing system (not shown) that does not include the cross-platform visible attributes 122 as outlined herein. The display 512 is generated by the first smart phone executing the iOS operating system based on the display data received from the content providing module 110 that supports the cross-platform visible attributes 122. Similarly the display 532 is generated by the second smart phone executing the Android operating system based on the display data received from the content providing module 110 that provides for the cross-platform visible attributes 122.

When the lower portion 504 of the display 502 is compared to the lower portion 514 of the display 512 it can be seen that the image shown in 514 is in clear focus and of better quality than the image shown in the lower portion 504. Similarly the image shown in the lower portion 534 of the display 532 has better focus and is clearly seen when compared to the image shown in the lower portion 524 of the screen 522. The images seen in the lower portions 504 and 524 are blurred and unclear. It may be appreciated that no additional configuration was required from the content-generating users for the displays 512 and 532. Rather, it was the content provider that comprised the content providing module 110 implementing the cross-platform visible attributes 122 in accordance with embodiments described herein that enabled generating superior displays 512, 532. As a result, the platforms associated with the respective smart phones that generated the displays 512 and 532 were enabled to correctly interpret the display data and configure the display of the images at 514 and 534 accurately. Another aspect that may be noted by comparing the display 512 with the display 532 is the similarity between the displays despite the differences in the platforms that generated the displays. Again the cross-platform visible attributes 122 contribute to the uniformity of the displays 512 and 532.

Figure 6:
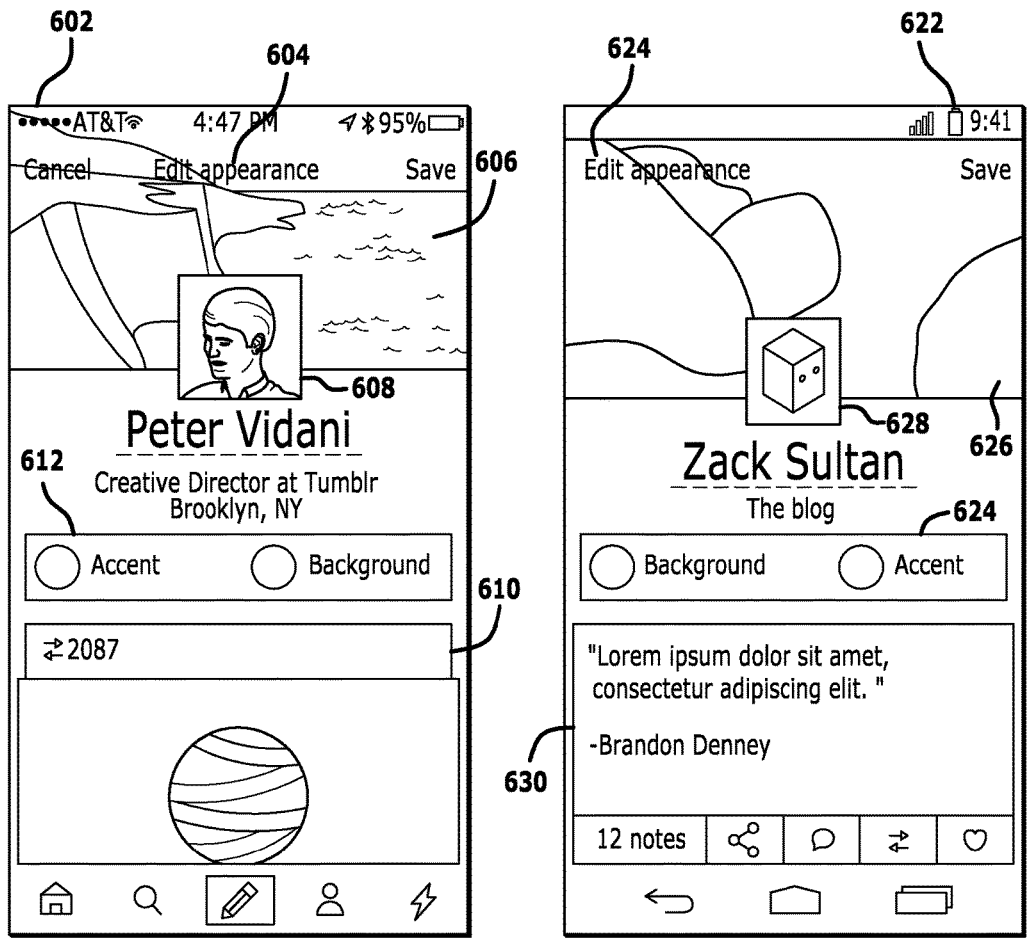
FIG. 6 shows a schematic diagram of the edit screens that are accessible to the generating users employing different platforms in accordance with one embodiment.

FIG. 6 shows a schematic diagram of the edit screens that are accessible to the generating users employing different platforms in accordance with one embodiment. The display 602 is generated on a smart phone executing the first operating system such as iOS for a first user generating the content shown in the display 602. An edit appearance menu 604 facilitates the generating user to edit the content appearance. In an embodiment, the user can edit one or more of the header image 606, the Avatar 608, the title 614, description 616 and the content portion 610. Further, the menu 612 enables the user to set the background and the accent for the content portion 610. A similar edit screen 622 is shown to a second generating user using a second operating system such as Android. The edit appearance menu 624 enables the second generating user to change one or more of the head image 626, the Avatar 628, the title 632, the description 634 and/or the content portion 630. The menu 636 enables the second generating user to change the background or the accent of the content portion 630. The values set by the user for one or more of the header image, the Avatar, the title, the description and the content portion are stored as the cross-platform visible attributes in the form of name value pairs in the user's profile. When retrieved by a client device, the cross-platform visible attributes are rendered as shown in the displays 602 and 622. Again the similarity of the display 602 to the display 622 may be noted. More particularly the structure of the display 602 is similar to the structure of the display 622 as the displays 602 and 622 are based on the same theme. Different themes can be employed by a user who generates content. For example, different combinations and arrangements of avatars, images, fonts, background colors and the like may be used in different themes. However, a selected theme may need to be programmed to use the visible attributes 122 in accordance with embodiments outlined herein in order that the selected theme may appear uniformly across various platforms. Thus, the appearance of a content item can be customized from any platform or any combination of device/operating system and can be synchronized to maintain its look and feel on any device.

Figure 7:
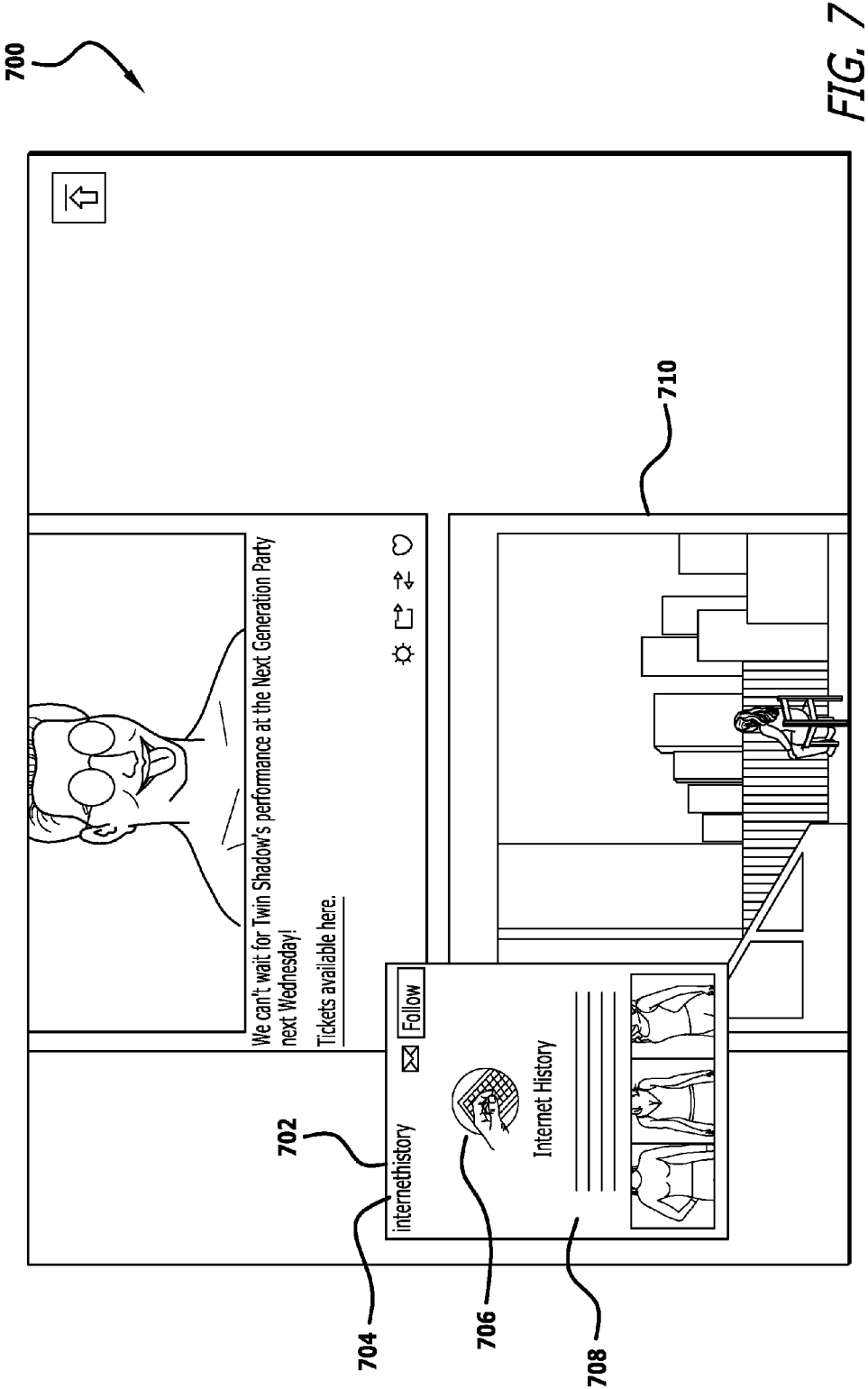
FIG. 7 shows a display of a pop over in accordance with one embodiment.

FIG. 7 shows a display 700 of a pop over in accordance with one embodiment. The pop over 702 of a content item is generated when a user hovers over the content item. A pop over 702 is generated by a client device transmitting a request only for the visible attributes of the underlying content item 710. The pop over 702 provides a summary view of an underlying user-generated content item 710 which in this case is a blog. The pop over 702 is a condensed view that shows the heading 704, avatar 706 and the content item 708 from the actual blog. Again, it may be noted that the visible attributes such as the images, font size, color, background color, heading and the like shown in the pop over 702 are based on the visible attributes of the underlying blog.

Figure 8:
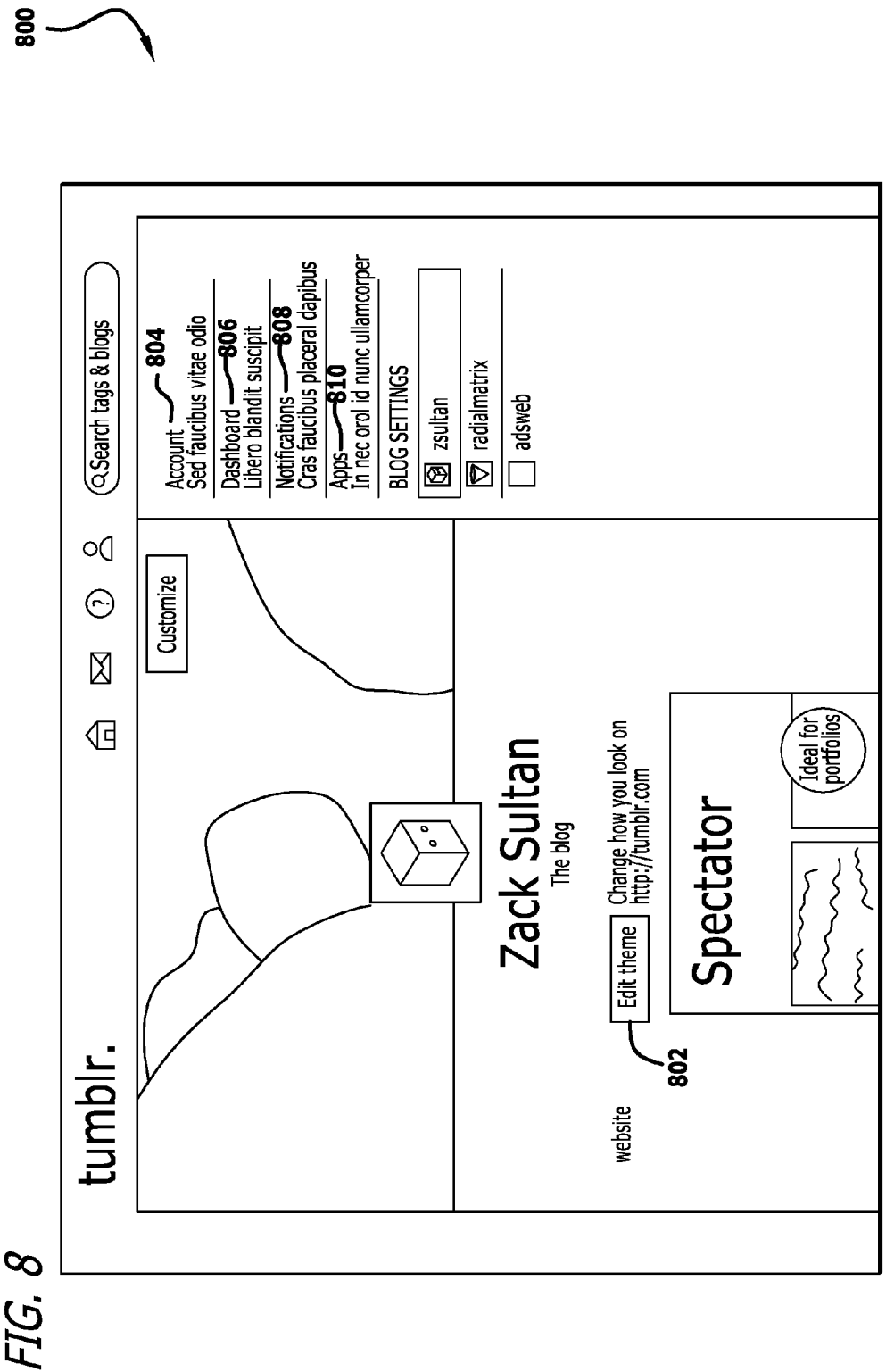
FIG. 8 shows a schematic diagram of a display that facilitates editing a theme in accordance with one embodiment.

FIG. 8 shows a schematic diagram 800 of a display that facilitates editing a theme in accordance with one embodiment. The display 800 can be generated by a device such as a laptop or a tablet device. The display 800 includes an edit element 802 that enables the user to edit the theme associated with his or her content. As discussed herein, different themes can be employed by the content-generating users for display of their content. In order to maintain the uniformity of its appearance across platforms a theme can be programmed to implement the cross-platform visible attributes 122. The display 800 also enables the user to edit his account 804, dashboard 806, notifications 808, apps 810 and the like.

Figure 9:
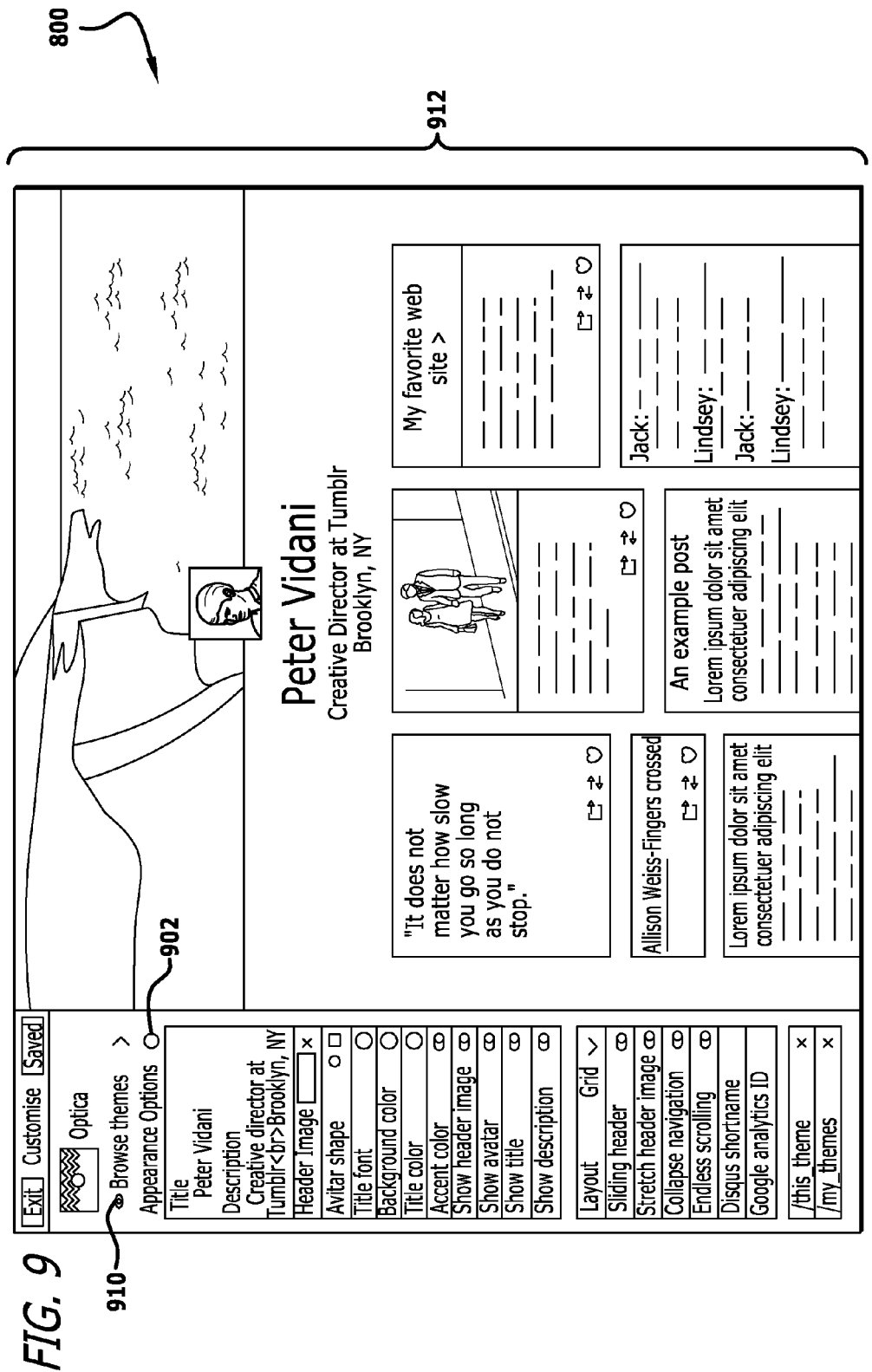
FIG. 9 shows a schematic diagram of a display screen that enables a generating user to edit the various attributes of a content item in accordance with one embodiment.

FIG. 9 shows a schematic diagram of a display screen 900 that enables a generating user to edit the various attributes of a content item in accordance with one embodiment. A menu option 910 labeled 'browse themes' enables the generating user to select from a plurality of pre-existing themes. A menu option 926 'customize' enables the generating user to customize a selected theme, the option 928 saves the changes while the option 924 allows the user to exit the screen. For a selected theme, such as the theme shown in the portion 912, a menu 902 labeled 'Appearance Options' is associated with the various visible attributes of the content item. As seen from FIG. 9, the appearance options menu 902 enables the generating user to select the various fields that can be included in a given theme. By the way of illustration and not limitation, the generating user can select whether or not to show a header image, an avatar, a title or description and the like. For the selected fields, the menu 902 further enables the generating user to set values for the visible attributes 122 such as but not limited to the text of the title and the description, the image to be used as the header image, avatar shape, title font, and the background color. For example, the value set by the generating user for the visible attributes 122 of a selected theme are seen as the header image 914, the title 916, the description 918 and the background 920. In accordance with embodiments described herein the appearance options selected by the generating user from the menu 902 are stored as the visible attributes 122 that can be accessed by the various platforms in order to render the content item as determined by the generating user. The menu 904 'Theme options' enables the generating user to set the various attributes of the theme associated with the content item, customize existing themes or select options for new themes. In an embodiment, the menu 904 can also be accessed via the edit element 802. As discussed herein a theme can be configured to use the cross-platform visible attributes 122 in order that the content item based on the theme can have a uniform 'look and feel' across the various platforms.

Figure 10:
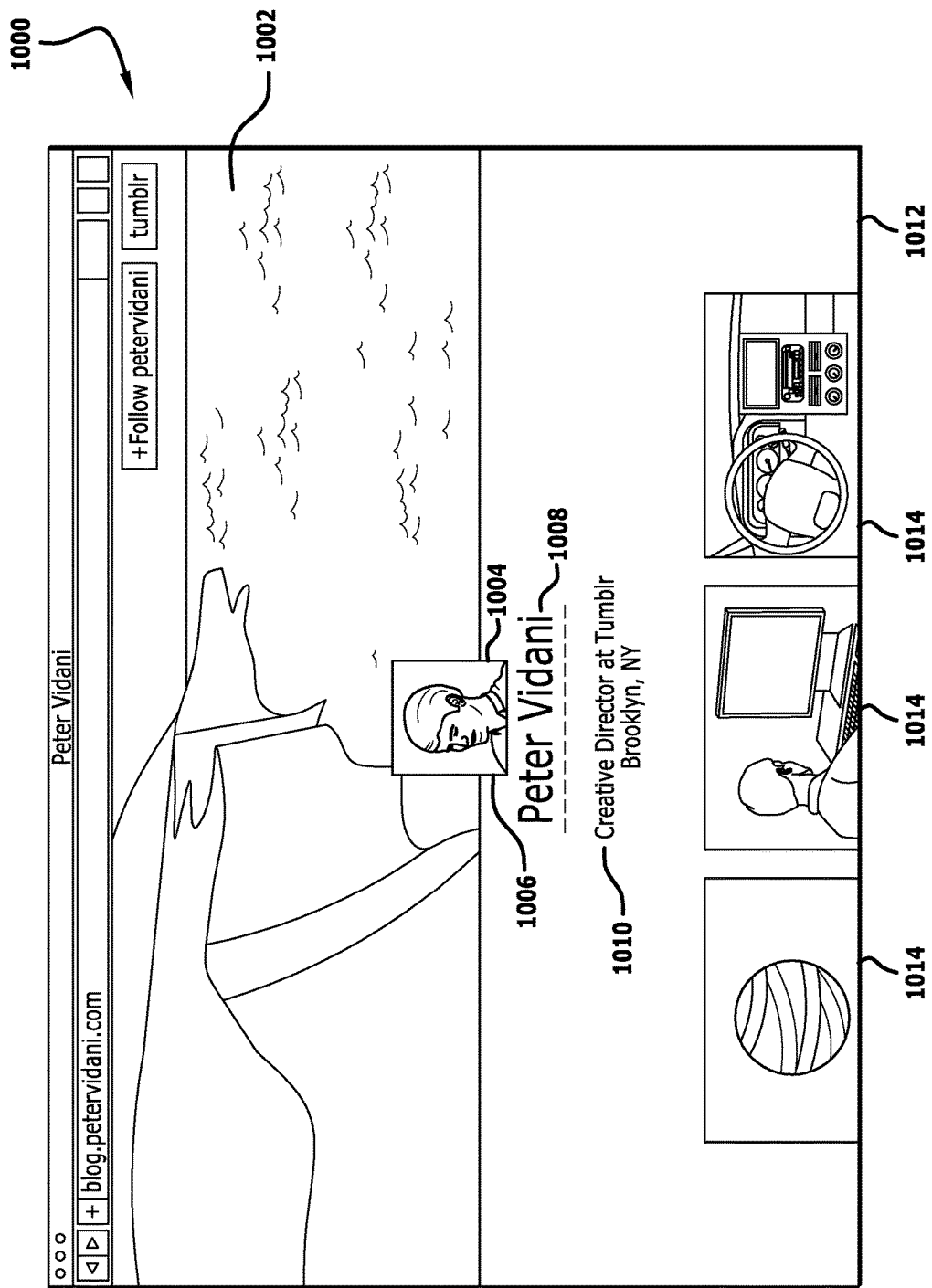
FIG. 10 is a schematic diagram that illustrates a theme configured to employ the cross-platform visible attributes in accordance with an embodiment.

FIG. 10 is a schematic diagram 1000 that illustrates a theme configured to employ the cross-platform visible attributes 122 in accordance with an embodiment. The user who generates the content item 1000 can use any device/operating system combination to set values for the header image 1002, the avatar 1004, the shape of the avatar 1006, the heading 1008, description 1010, background 1012 and the content 1014. The values set by the user are maintained as visible attributes 122 in the user's profile on the user profile database 120. In an embodiment, the visible attributes 122 are stored as an ordered set of name-value pairs as specified by the JSON data interchange format. This enables the generating user to use any device to set or amend the visible attributes 122 with the assurance that the content item 1000 will maintain a uniform look and feel across the various platforms employed by different viewers.

Figure 11:
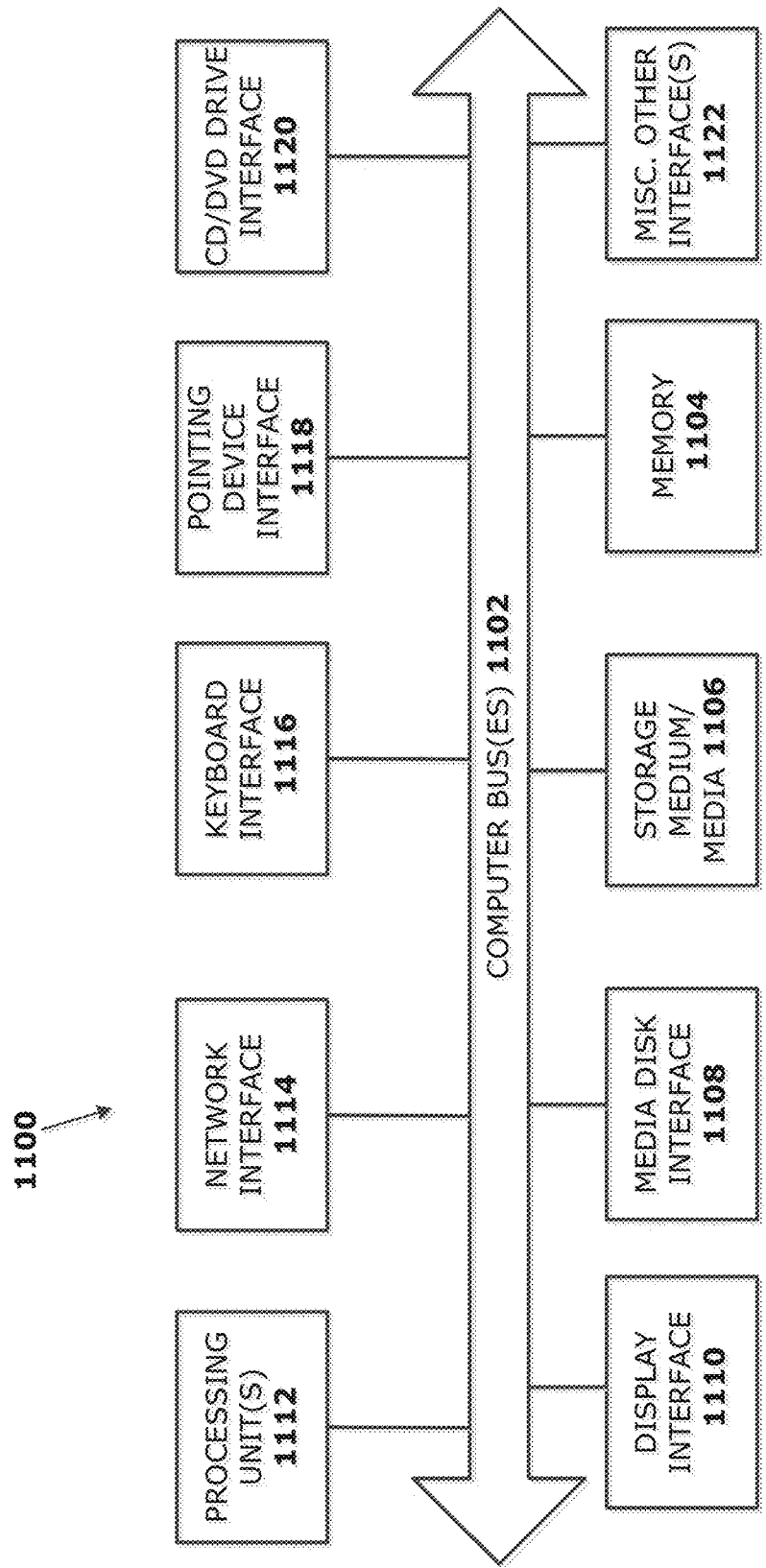
FIG. 11 illustrates the internal architecture of a computing device in accordance with embodiments described herein.

As shown in the example of FIG. 11, internal architecture of a computing device 1100, for example the server 106, includes one or more processing units (also referred to herein as CPUs) 1112, which interface with at least one computer bus 1102. Also interfacing with computer bus 1102 are persistent storage medium/media 1106, network interface 1114, memory 1104, e.g., random access memory (RAM), run-time transient memory, read only memory (ROM), etc., media disk drive interface 1108, an interface 1120 for a drive that can read and/or write to media including removable media such as floppy, CD-ROM, DVD, etc., media, display interface 1110 as interface for a monitor or other display device, keyboard interface 1116 as interface for a keyboard, pointing device interface 1118 as an interface for a mouse or other pointing device, and miscellaneous other interfaces 1122 not shown individually, such as parallel and serial port interfaces, a universal serial bus (USB) interface, and the like.

Memory 1104 interfaces with computer bus 1102 so as to provide information stored in memory 1104 to CPU 1112 during execution of software programs such as an operating system, application programs, device drivers, and software modules that comprise program code or logic, and/or computer-executable process steps, incorporating functionality described herein, e.g., one or more of process flows described herein. CPU 1112 first loads computer-executable process steps or logic from storage, e.g., memory 1104, storage medium/media 1106, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage medium/media 1106 is a computer readable storage medium(s) that can be used to store software and data, e.g., an operating system and one or more application programs. Persistent storage medium/media 1106 can also be used to store device drivers, such as one or more of a digital camera driver, monitor driver, printer driver, scanner driver, or other device drivers, web pages, content files, metadata, playlists and other files. Persistent storage medium/media 1106 can further include program modules/program logic in accordance with embodiments described herein and data files used to implement one or more embodiments of the present disclosure.

Figure 12:
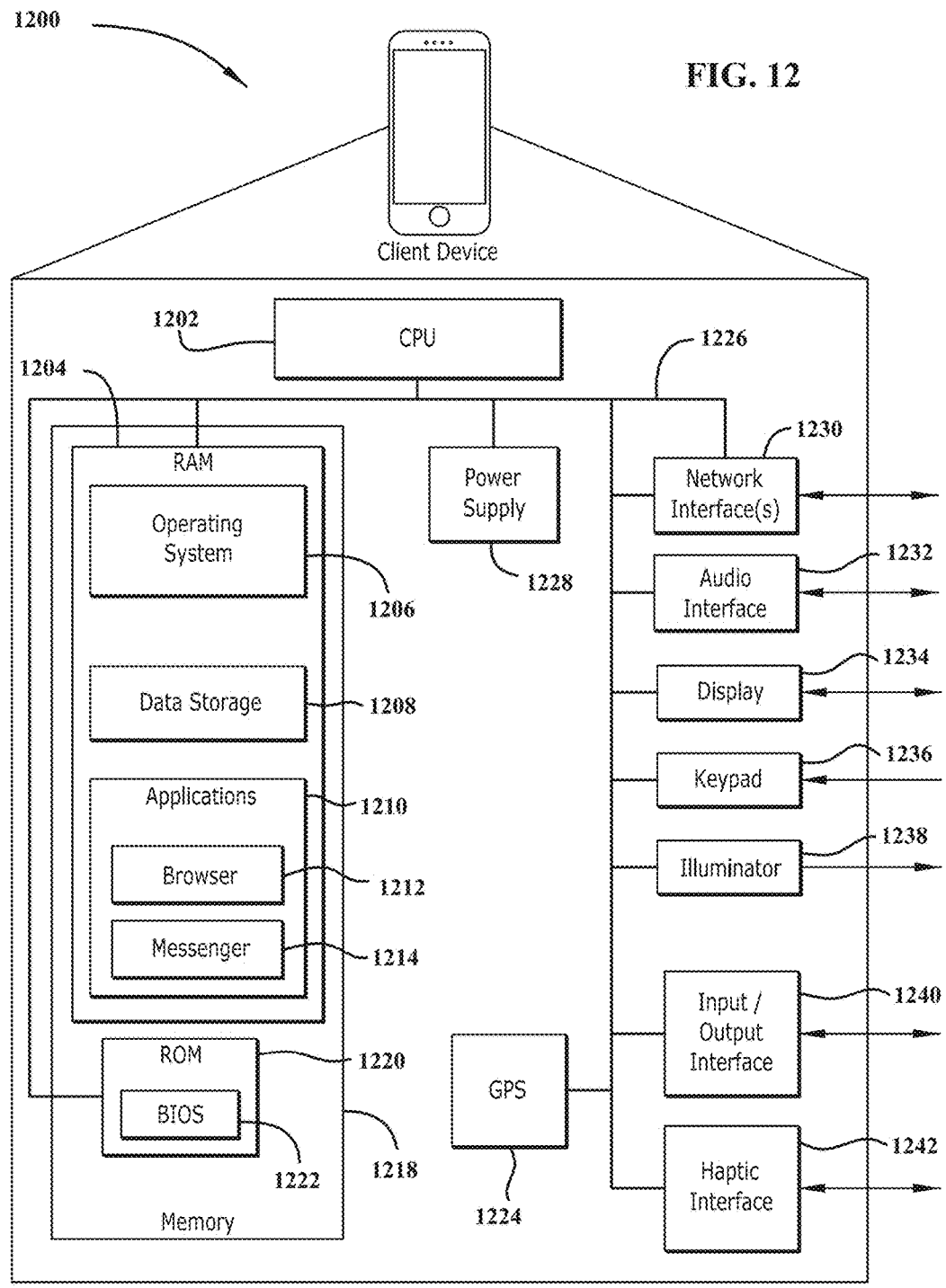
FIG. 12 is a schematic diagram illustrating a client device implementation of a computing device in accordance with embodiments of the present disclosure.

FIG. 12 is a schematic diagram illustrating a client device implementation of a computing device, for example, client device 102, in accordance with embodiments of the present disclosure. A client device 1200 may include a computing device capable of sending or receiving signals, such as via a wired or a wireless network, and capable of running application software or "apps" 1210. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device or a user device can include standard components such as a CPU 1202, power supply 1228, a memory 1218, ROM 1220, BIOS 1222, network interface(s) 1230, audio interface 1232, display 1234, keypad 1236, illuminator 1238, I/O interface 1240 interconnected via circuitry 1226. Claimed subject matter is intended to cover a wide range of potential variations. For example, the keypad 1236 of a cell phone may include a numeric keypad or a display 1234 of limited functionality, such as a monochrome liquid crystal display (LCD) for displaying text. In contrast, however, as another example, a web-enabled client device 1200 may include one or more physical or virtual keyboards 1236, mass storage, one or more accelerometers, one or more gyroscopes, global positioning system (GPS) 1224 or other location identifying type capability, Haptic interface 1242, or a display with a high degree of functionality, such as a touch-sensitive color 2D or 3D display, for example. The memory 1218 can include Random Access Memory 1204 including an area for data storage 1208.

A client device 1200 may include or may execute a variety of operating systems 1206, including a personal computer operating system, such as a Windows, iOS or Linux, or a mobile operating system, such as iOS, Android, or Windows Mobile, or the like. A client device 1200 may include or may execute a variety of possible applications 1210, such as a client software application 1214 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1200 may also include or execute an application to communicate content, such as, for example, textual content, multimedia content, or the like. A client device 1200 may also include or execute an application to perform a variety of possible tasks, such as browsing 1212, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a processor, a request from a client device for at least visible attributes of a content item, wherein the content item is customized in accordance with the visible attributes set by a user generating the content item and the request comprises information associated with a respective platform of the client device;
   retrieving from a profile of the generating user, by the processor, the visible attributes of the content item;
   selecting, by the processor, at least the visible attributes as display data to be transmitted to the client device;
   determining, by the processor, based on the information associated with the respective platform of the client device included in the request, that a template should be added to the display data comprising the retrieved visible attributes for transmission;
   identifying, by the processor, a type of the content item and the respective platform of the client device;
   selecting, by the processor, an Application Programming Interface (API) based on the identified type of the content item and the respective platform of the client device;
   selecting, by the processor, the template from a plurality of templates based on the selected API, each of the plurality of templates associated with a respective API of a plurality and is configured to uniformly display the content item in accordance with the visible attributes set by the generating user on the respective platform of the client device;
   including, by the processor, the selected template in the display data to be transmitted to the client device;
   transmitting, by the processor, the display data to the client device.

2. The method of claim 1, further comprising:
   determining, by the processor based on the request, if the content item should be include in the display data to be transmitted to the client device; and
   including, by the processor, the content item in the display data to be transmitted to the client device.

3. The method of claim 1, wherein the platform comprises a combination of hardware and software operable to render the content item on the client device.

4. The method of claim 1, further comprising:
   providing, by the processor, a user interface to the generating user for providing the visible attributes.

5. The method of claim 1, wherein the visible attributes are stored as an ordered set of name value pairs in the profile of the generating user.

6. The method of claim 5, further comprising:
   receiving, by the processor, input from the generating user for changing at least one of the visible attributes; and
   changing, by the processor, value of the at least one visible attribute based on the input.

7. The method of claim 1, wherein the content item is a blog.

8. The method of claim 7, wherein the visible attributes determine a header image, an avatar and a background of the blog.

9. The method of claim 7, wherein the blog comprises content item from a first blog and a second blog.

10. The method of claim 9, wherein the display data further comprises the visible attributes provided by a first user generating the first blog and a second user generating the second blog.

11. An apparatus comprising:
    at least one processor;
    a storage medium for tangibly storing thereon program logic for execution by the processor, the program logic comprising:
    receiving logic, executed by the processor, for receiving a request from a client device, the request associated with at least visible attributes of a content item and comprising information associated with a respective platform of the client device, wherein the content item is customized in accordance with the visible attributes set by a user generating the content item;
    retrieving logic, executed by the processor, for retrieving from a profile of the generating user, the visible attributes of the content item;
    attributes selecting logic, executed by the processor, for selecting at least the visible attributes as display data to be transmitted to the client device;
    template determining logic, executed by the processor, for determining based on the information associated with the respective platform of the client device included in the request, that a template should be added to the display data comprising the retrieved visible attributes for transmission;
    identifying logic, executed by the processor, for identifying a type of the content item and the respective platform of the client device;
    API selecting logic, executed by the processor, for selecting an Application Programming Interface (API) based on the identified type of the content item and the respective platform of the client device;
    template selecting logic, executed by the processor, for selecting the template from a plurality of templates based on the selected API, each of the plurality of templates associated with a respective API of a plurality and is configured to uniformly display the content item in accordance with the visible attributes set by the generating user on the respective platform of the client device;
    template including logic, executed by the processor, for including the selected template in the display data to be transmitted to the client device;
    transmitting logic, executed by the processor, for transmitting the display data to the client device.

12. The apparatus of claim 11, wherein the platform comprises a combination of hardware and software operable to render the content item on the client device.

13. The apparatus of claim 11, further comprising:
providing logic, executed by the processor, for providing a user interface to the generating user for providing the visible attributes.

14. The apparatus of claim 11, further comprising:
storing logic, executed by the processor, for storing the visible attributes as an ordered set of name value pairs in the profile of the generating user.

15. A non-transitory computer readable storage medium, comprising instructions, which when executed by a processor cause the processor to:
receive a request from a client device, the request associated with at least visible attributes of a content item, wherein the content item is customized in accordance with the visible attributes set by a user generating the content item and the request comprises information associated with a respective platform of the client device;
retrieve from a profile of the generating user the visible attributes of the content item;
select at least the visible attributes as display data to be transmitted to the client device;
determine based on the information associated with the respective platform of the client device included in the request, that a template should be added to the display data comprising the retrieved visible attributes for transmission;
identify a type of the content item and the respective platform of the client device;
select an Application Programming Interface (API) based on the identified type of the content item and the respective platform of the client device;
select the template from a plurality of templates based on the selected API, each of the plurality of templates associated with a respective API of a plurality and is configured to uniformly display the content item in accordance with the visible attributes set by the generating user on the respective platform of the client device;
include, the selected template in the display data to be transmitted to the client device;
transmit the display data to the client device.

16. The computer readable medium of claim 15, wherein the visible attributes are stored as an ordered set of name value pairs in the profile of the generating user.

17. The computer readable medium of claim 16, further comprising instructions that cause the processor to:
receive an input from the generating user for changing at least one of the visible attributes; and
change a value of the at least one visible attribute based on the input.

18. The computer readable medium of claim 15, wherein the content item is a blog.

19. The computer readable medium of claim 18, wherein the visible attributes determine a header image, an avatar and a background of the blog.

20. The computer readable medium of claim 15, wherein the instructions to retrieve the visible attributes of the content item further comprise instructions to:
retrieve the visible attributes of the content item from a user profile stored on a user profile database.

* * * * *